(12) United States Patent
Ahmadi

(10) Patent No.: US 9,584,986 B2
(45) Date of Patent: Feb. 28, 2017

(54) MANAGING MULTICAST GROUPS AND SCHEDULE TO IMPROVE TELECOMMUNICATION BANDWIDTH UTILIZATION AND POWER EFFICIENCY

(71) Applicant: Apple Inc., Cupertino, CA (US)

(72) Inventor: Sassan Ahmadi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 194 days.

(21) Appl. No.: 13/731,797

(22) Filed: Dec. 31, 2012

(65) Prior Publication Data

US 2014/0185513 A1     Jul. 3, 2014

(51) Int. Cl.
   *H04W 4/00*     (2009.01)
   *H04W 4/08*     (2009.01)

(52) U.S. Cl.
   CPC .............. *H04W 4/08* (2013.01); *Y02B 60/50* (2013.01)

(58) Field of Classification Search
   CPC ........................................... H04W 4/08
   USPC ........................................ 370/312
   See application file for complete search history.

(56) References Cited

U.S. PATENT DOCUMENTS

| | | |
|---|---|---|
| 6,647,020 B1 | 11/2003 | Maher et al. |
| 7,505,760 B2 | 3/2009 | Hurst et al. |
| 8,023,433 B2 | 9/2011 | Andou et al. |
| 2010/0142447 A1* | 6/2010 | Schlicht et al. ............ 370/328 |
| 2010/0165902 A1 | 7/2010 | Kvernvik et al. |
| 2012/0078953 A1* | 3/2012 | Araya ........................ 707/769 |
| 2012/0172031 A1* | 7/2012 | Marocchi .............. H04W 4/06 455/422.1 |
| 2013/0194999 A1* | 8/2013 | Anchan ....................... 370/312 |
| 2014/0095924 A1* | 4/2014 | Holden ....................... 714/4.11 |

* cited by examiner

*Primary Examiner* — Wei Zhao
(74) *Attorney, Agent, or Firm* — Meyertons, Hood, Kivlin, Kowert & Goetzel, P.C.

(57) ABSTRACT

A method may include receiving, by a transceiver, an upload content from a device among a plurality of devices, determining, by a controller, use conditions associated with each of the plurality of devices, forming a group of more than one device among the plurality of devices, based on the upload content and the use conditions; and transmitting, by the transceiver, the upload content to the group of more than one device simultaneously.

35 Claims, 4 Drawing Sheets

100

200

300

MANAGING MULTICAST GROUPS AND SCHEDULE TO IMPROVE TELECOMMUNICATION BANDWIDTH UTILIZATION AND POWER EFFICIENCY

BACKGROUND

The proliferation of mobile wireless devices has created a strong demand for increase in data accessibility and bandwidth. For example, as the emerging cloud services allow users to access and share data remotely from centralized cloud storage on many mobile clients, users' demand for cloud storage space and access bandwidth will grow substantially.

In a cloud-based storage and content distribution scheme, users may share the content generated or uploaded with any of the user's registered devices or with other users' devices. All devices sharing such contents may have virtually simultaneous availability of the content continuously.

This sharing may be done via unicast communication connections to wireless communication networks. Unicast communication may refer to the communication of information to a single specific destination in a single transmission from a source. Because a single piece of content may be shared with multiple devices, unicast distribution of the identical information may result in waste of bandwidth resources and may lower the capacity of the communication network. A network in this configuration may suffer capacity issues and cause unsatisfactory user experience.

Thus, there is a need for an improved way of communicating content to multiple devices.

DETAILED DESCRIPTION

According to an embodiment, a method may include receiving, by a transceiver, an upload content from a first device among a plurality of devices, determining, by a controller, use conditions associated with each of the plurality of devices, forming a group of more than one device among the plurality of devices, based on the upload content and the use conditions; and transmitting, by the transceiver, the upload content to the group of more than one device simultaneously.

Communication of information to multiple specific destination devices simultaneously in a single transmission from a source may be referred to as multicast communication.

Figure 1:
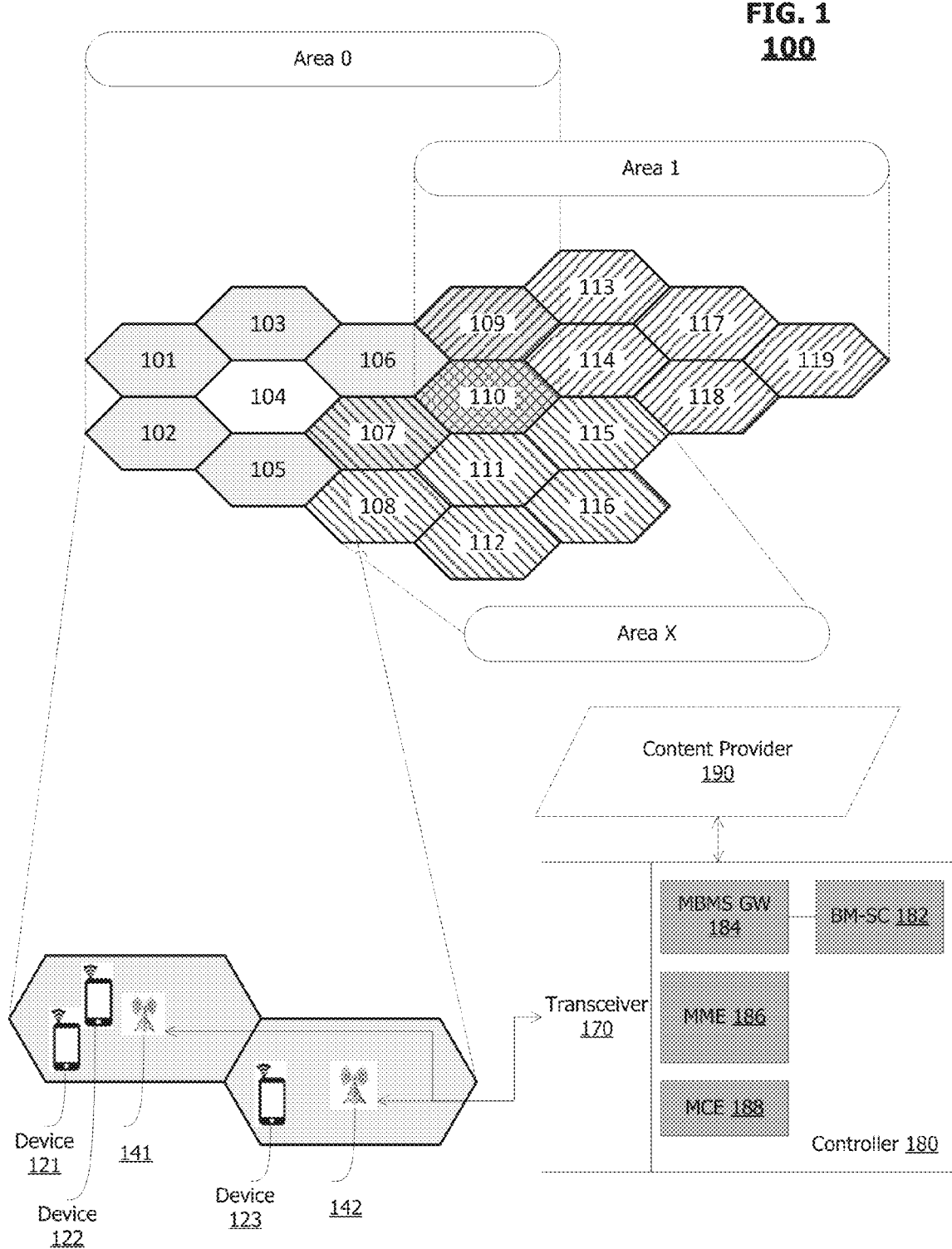
FIG. 1 illustrates a system according to an embodiment of the present disclosure.

FIG. 1 illustrates a system 100 according to an embodiment.

Figure 2:
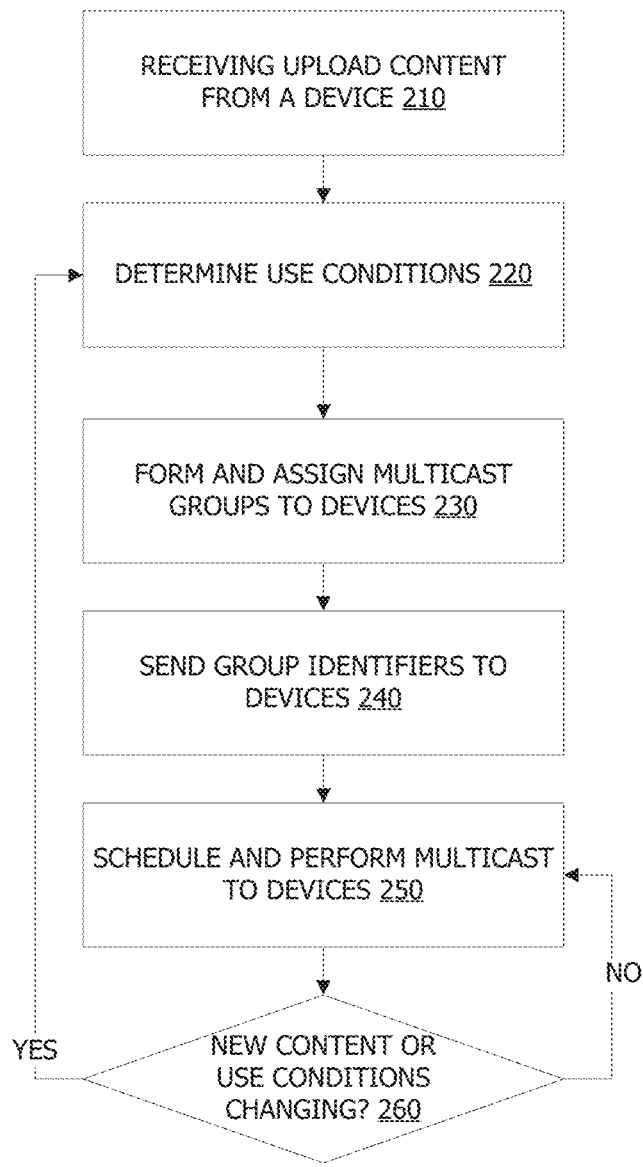
FIG. 2 illustrates a method according to an embodiment of the present disclosure.

The system 100 may include a transceiver 170 and a controller 180, to implement the method 200 in FIG. 2. The system 100 may store a non-transitory computer readable medium executable to implement the method 200 in FIG. 2.

The transceiver 170 may receive an upload content from a device (for example, 121), to be uploaded to a content provider 190. The controller 180 may determine use conditions associated with each of plurality of devices (for example 122-123). A group of more than one device (for example, group of 122-123) may be formed, based on the upload content and the use conditions determined. The upload content may be transmitted by the transceiver 170 to the group of more than one device (for example, group of 122-123) simultaneously.

According to an embodiment, the controller 180 may include a Broadcast/Multicast Service Center (BM-SC) 182, a multimedia broadcast and multicast service gateway (MBMS GW) 184, a Mobility Management Entity (MME) 186, and a Multi-cell/Multicast Coordination Entity (MCE) 188.

The BM-SC 182 may be tasked for authentication, authorizing access with content provider 190, charging and the overall configuration of the data flow through the network. The MBMS GW 184 may be a logical node handling the multicast of IP packets from the BM-SC 182 to all base stations, for example 141, 142. The MBMS GW 184 may also handle session control via the MME 186. The MME 186 may be a part of a 3GPP Release 8 network architecture. The MME 186 may handle all tasks not related to the air interface control, for example, Non-Access Stratum (NAS) protocols. The MCE 188 may coordinate the use of the shared resources and transmission parameters across multiple radio cells that belong to a multicast area, to multicast information to multiple devices 121-123 simultaneously. The MCE 188 may be integrated directly to the base stations or added as separate network element to the architecture.

FIG. 1 illustrates exemplary multicast Areas 0, 1, and X. Multiple radio cells may belong to a multicast area. For example, cells 101, 102, 103, 105, 106, 107, 109, 110 may belong to Area 0. Cells 109, 110, 113, 114, 117, 118, 119 may belong to Area 1. Cells 107, 108, 110, 111, 112, 115, 116 may belong to Area X. Each cell may belong to more than one multicast area. For example, cell 107 may belong to Areas 0 and X, cell 109 may belong to Areas 0 and 1, and cell 110 may belong to Areas 0, 1 and X. Multicast areas may be defined statically or dynamically, depending on network hardware capabilities. In a Multimedia Broadcast Single Frequency Network (MBSFN), for example, every cell can be part of up to eight MBSFN areas. There could be up to 256 different MBSFN areas defined, each one with an unique identity.

FIG. 2 illustrates a method 200 according to an embodiment of the present disclosure.

The method 200 may include receiving an upload content from a device among a plurality of devices (block 210). Use conditions associated with each of the devices may be determined (block 220). A group of more than one device may be formed and assigned to the devices (block 230). Group identifiers may be sent to the corresponding devices (block 240). Then, the upload content may be transmitted to the group of more than one device in scheduled group communication (block 250). If new upload content is added or the use conditions changes, the use conditions for the devices may be updated, and group assignments may be reconfigured (block 260). If no new upload content and the use conditions are not changed, the group communication may continue to be scheduled and performed using the same grouping of devices (block 260).

According to an embodiment, the use conditions of each device may be determined based user identifications of the devices, locations of the devices, applications executing on the devices, channel qualities of the devices, capabilities of the devices, and qualities of service (QoS) requirements of the devices. The multicast grouping may receive the quality of the application/service information from the user devices to determine grouping. A single user device may be assigned to multiple multicast groups. Several multicast groups may be served at the same time depending on the loading of the network and availability of the radio resources.

The upload content may be uploaded and stored in a cloud content provider 190, to be propagated to an user's devices or to be shared among multiple users' devices. The upload content may include software updates or full software downloads. The upload content may be downloaded during multicast by applications executing on the user devices.

An example of an use condition may be the power state of the user devices (mobile station, user equipment). The frequency and occurrence of such updates may be synchronized with the discontinuous reception (DRX) cycles configured for the user device by the serving base station in order to allow the device to reduce radio transmission or reception and to conserve power. During a short DRX cycle, the user device may be in a mode with an active connection and thus may be able to check the downlink control channels to determine whether it has pending data transmission or it has to await updated system information. During long DRX cycles, the user equipment may be in a mode with no active connection with network, and no transmission/reception activity may be performed to reduce power consumption. Thus, grouping the devices into multicast groups may need to take into account individual user device DRX schedule.

During handover from one cell to another cell, the user device context information may be transferred from a serving base station to a target base station, and data transmission may be resumed after a short break which may be referred to as "handover interruption time". The target base station, upon handover, may regroup the user applications to ensure uninterrupted/continuation of the service to the user. The target base station may use the same or different grouping criteria relative to the serving base station when regroup the user applications.

Figure 3:
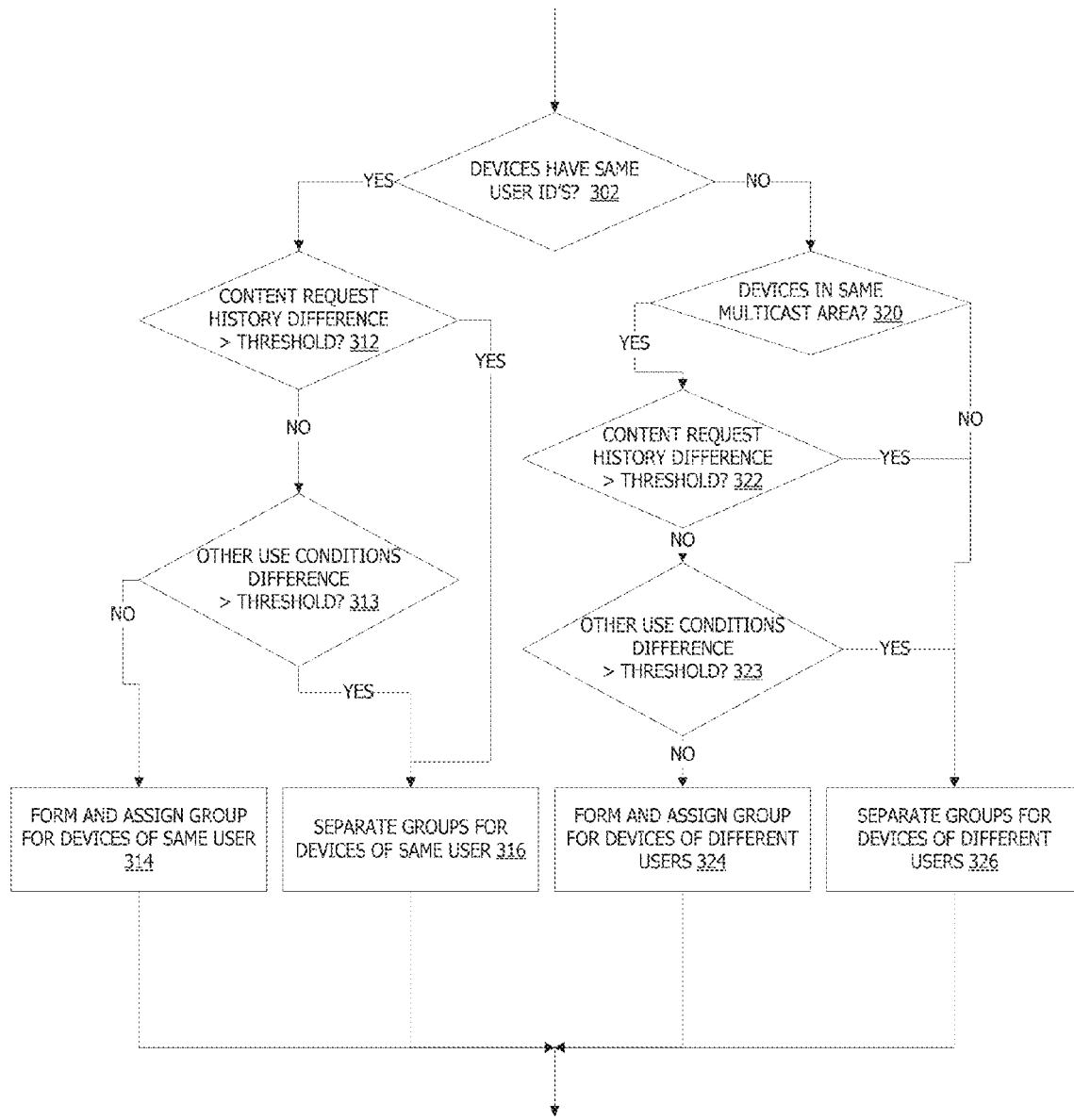
FIG. 3 illustrates a method according to a feature of the present disclosure.

FIG. 3 illustrates a method 300 according to a feature of the present disclosure. The method 300 may be included as part of forming and assigning a group of more than one device in block 230 of the method 200, as a possible way of matching and grouping user devices based on the upload content and the use conditions determined for the devices. Other possible methods of grouping user devices may also be possible.

The method 300 may include determining whether multiple devices have a same user identification (block 302). If the devices have the same user identification, then determining whether the content request history of each device has more than threshold amount of differences from the content request histories of the other devices (block 312). If the devices have similar content request histories, then determining whether the other use conditions of each device have more than a threshold mount of differences from the other devices (block 313). If the devices have similar other use conditions, then the devices are assigned to form a group for the devices having the same user identification (block 314). Otherwise, devices having greater than a threshold amount of differences in content request histories, or having greater than a threshold amount of differences in other use conditions are separated from each other in grouping (block 316).

If the devices have different user identifications, then determining whether the devices have locations in a same multicast area (block 320). If the devices of different user identifications have locations in the same multicast area, then determining whether the content request history of each device have more than threshold amount of differences from the content request histories of the other devices (block 322). If the devices have similar content request histories, then determining whether the other use conditions of each device have more than a threshold mount of differences from the other devices (block 323). If the devices have similar other use conditions, then the devices are assigned to form a group for the devices having the same user identification (block 324). Otherwise, devices having locations in different multicast areas, or having greater than a threshold amount of differences in content request histories, or having greater than a threshold amount of differences in other use conditions, are separated from each other in grouping (block 326).

The same type of application running on two or more user devices may be configured differently such that the downlink content or update schedules may be slightly or dramatically different. If the extent of differences in the content request histories from two or more user applications is more than a threshold amount (for example, a percentage threshold), of the entire requested content of the group, user devices may be group separately or isolated from the other devices or the group. All devices of similar content request histories and use conditions may be grouped together. Additionally, use conditions may be determined based on historical performance data of groups, such as latencies. If the traffic amount at specific user device locations or upload content amount for the group is relatively low, then non-grouped communication may be favored to avoid unnecessary group determination.

Figure 4:
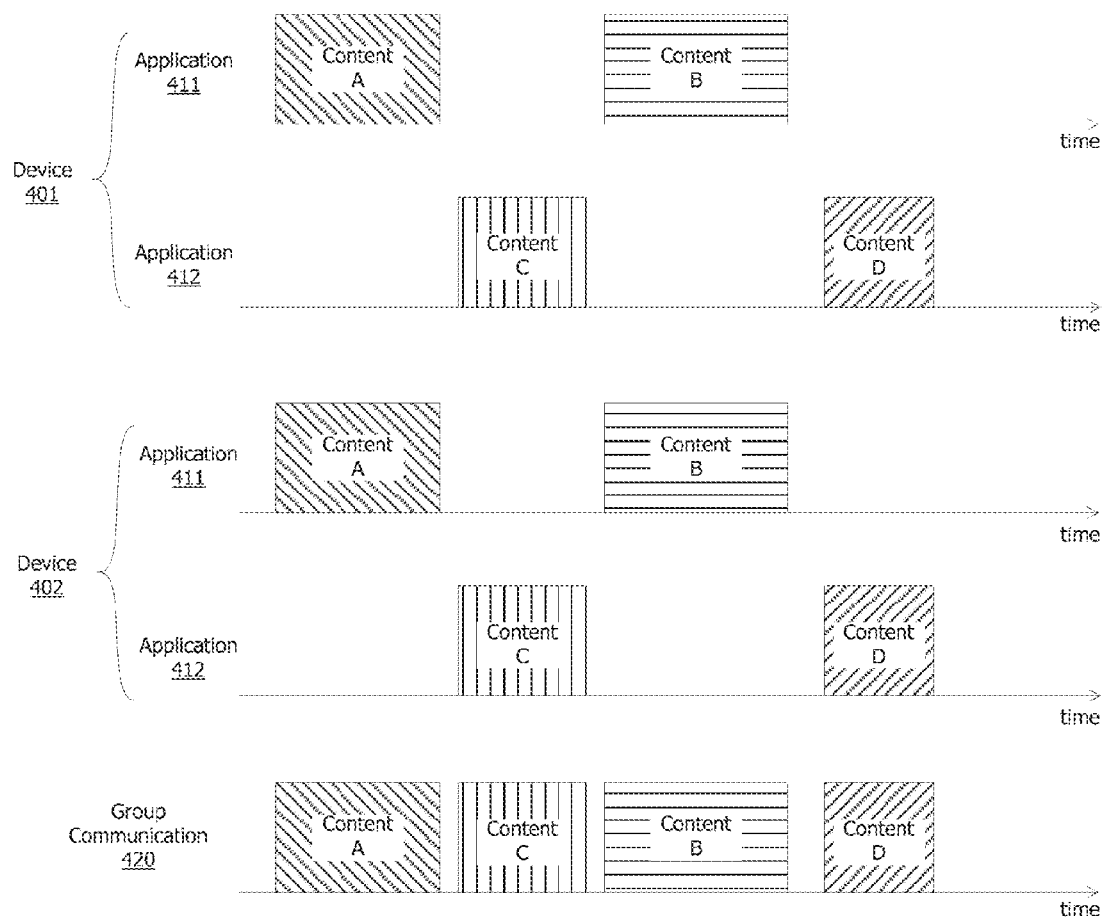
FIG. 4 illustrates a group communication according to an embodiment of the present disclosure.

FIG. 4 illustrates an exemplary group communication according to an embodiment of the present disclosure.

Assuming for example that Devices 401 and 402 are in the same group, with Devices 401 and 402 each running Applications 411 and 412. Application 411 may request upload contents A and B, and Application 412 may request upload contents C and D. Group Communication 420 may be scheduled in such a manner as to transmit each of the upload contents A, B, C, and D to all Devices 401 and 402 in the group simultaneously, without having to repeat transmission of any of the upload contents. Thus, Group Communication 420 may represent an efficient way of communicating contents to multiple devices with bandwidth saving.

What is claimed:

1. A method, comprising:
responsive to receiving, by a cellular communications network, an upload content from a first device, determining, by a controller of the cellular communications network, use conditions associated with a plurality of devices to receive the upload content, wherein the use conditions include channel qualities of the plurality of devices;
forming, by the controller, a group of more than one of the plurality of devices based on devices' respective use conditions;
transmitting a group identifier to the devices that are admitted to the group; and
transmitting, by the cellular communications network, the upload content to the group of devices in a multicast transmission addressed using the group identifier.

2. The method of claim 1, wherein the controller determines the use conditions based on user identifications of the plurality of devices.

3. The method of claim 1, further comprising:
updating the use conditions; and
changing the group of more than one device based on the updated use conditions.

4. The method of claim 1, wherein the controller forms the group of the more than one device if the more than one device has a same user identification.

5. The method of claim 1, wherein the controller forms the group of the more than one device if the more than one device have different user identifications and have locations in a same multicast area.

6. The method of claim 1, wherein the controller separates a second device from the group of the more than one device if content request history of the second device is different from content request history of the more than one device by more than a threshold amount.

7. The method of claim 1, wherein the controller separates a second device from the group of the more than one device if the use conditions of the second device are different from the use conditions of the more than one device by more than a threshold amount.

8. A non-transitory machine-readable storage medium, having program instructions executable by a processor to perform operations comprising:
responsive to receiving, by a cellular communications network, an upload content from a first device, determining, by a controller of the cellular communications network, use conditions associated with a plurality of devices to receive the upload content, wherein the use conditions include quality of service (QoS) requirements for the plurality of devices;
forming, by the controller, a group of more than one of the plurality of devices based on the devices' respective use conditions;
transmitting a group identifier to the devices that are admitted to the group; and
transmitting, by the cellular communications network, the upload content to the group of devices in a multicast transmission addressed using the group identifier.

9. The non-transitory machine-readable storage medium of claim 8, wherein the controller determines the use conditions based on one of user identifications of the plurality of devices, locations of the plurality of devices, applications executing on the plurality of devices, channel qualities of the plurality of devices, and capabilities of the plurality of devices.

10. The non-transitory machine-readable storage medium of claim 8, the operations further comprising:
updating the use conditions; and
changing the group of more than one device based on the updated use conditions.

11. The non-transitory machine-readable storage medium of claim 8, wherein the controller forms the group of the more than one device if the more than one device has a same user identification.

12. The non-transitory machine-readable storage medium of claim 8, wherein the controller forms the group of the more than one device if the more than one device has different user identifications and have locations in a same multicast area.

13. The non-transitory machine-readable readable storage medium of claim 8, wherein the controller separates a second device from the group of the more than one device if content request history of the second device is different from content request history of the more than one device by more than a threshold amount.

14. The non-transitory machine-readable storage medium of claim 8, wherein the controller separates a second device from the group of the more than one device if the use conditions of the second device are different from the use conditions of the more than one device by more than a threshold amount.

15. A system of a cellular communications network, the system comprising:
at least one transceiver to:
receive an upload content from a first device;
transmit a group identifier to a group of more than one of a plurality of devices that are to receive the upload content; and
transmit the upload content to the group of devices in a multicast transmission addressed using the group identifier; and
a controller to:
responsive to receiving the upload content from the first device, determine use conditions associated with each of the plurality of devices to receive the upload content, wherein the use conditions include locations of the plurality of devices; and
form the group of one or more of the plurality of devices based on the devices' respective use conditions.

16. The system of claim 15, wherein the controller determines the use conditions based on one of user identifications of the plurality of devices, applications executing on the plurality of devices, channel qualities of the plurality of devices, capabilities of the plurality of devices, and qualities of service (QoS) requirements of the plurality of devices.

17. The system of claim 15, wherein the controller forms the group of the more than one device if the more than one device has a same user identification.

18. The system of claim 15, wherein the controller forms the group of the more than one device if the more than one device has different user identifications and have locations in a same multicast area.

19. The system of claim 15, wherein the controller separates a second device from the group of the more than one device if content request history of the second device is different from content request history of the more than one device by more than a threshold amount.

20. The system of claim 15, wherein the controller separates a second device from the group of the more than one device if the use conditions of the second device are different from the use conditions of the more than one device by more than a threshold amount.

21. The method of claim 1, wherein the use conditions include power states of the plurality of devices.

22. The method of claim 1, wherein the transmitting is synchronized with discontinuous reception cycles of the group of more than one device.

23. The method of claim 1, further comprising:
transferring service of at least one of the group of more than one device from a first base station to a second base station; and
forming a different group of more than one device in response to the transferring.

24. The method of claim 1, further comprising:
determining a first set of devices from the plurality of devices that have a same user identification;
determining a second set of devices from the first set of devices that have content request histories that differ by less than a threshold amount; and
determining a third set of devices from the second set of devices that have other use conditions that differ by less than a threshold amount,
wherein the group of more one device is formed as the third set of devices.

25. The method of claim 1, further comprising:
    determining a first set of devices from the plurality of devices that have locations in a common multicast area defined by the cellular communications network;
    determining a second set of devices from the first set of devices that have content request histories that differ by less than a threshold amount; and
    determining a third set of devices from the second set of devices that have other use conditions that differ by less than a threshold amount,
    wherein the group of more than one device is formed as the third set of devices.

26. The method of claim 1, wherein the controller determines the use conditions based on locations of the plurality of devices.

27. The method of claim 1, wherein the controller determines the use conditions based on applications executing on the plurality of devices.

28. The method of claim 1, wherein the controller determines the use conditions based on capabilities of the plurality of devices.

29. The method of claim 1, wherein the controller determines the use conditions based on qualities of service requirements of the plurality of devices.

30. The method of claim 1, wherein the upload content includes content for a software application common to the group of more than one device.

31. The method of claim 1, wherein the upload content includes first upload content for a first software application of the group of more than one device and second upload content for a second software application of the group of more than one device.

32. The method of claim 1, wherein the group of more than one device includes devices located in a single cell of the cellular communications network.

33. The method of claim 1, wherein the group of more than one device includes devices located in a selected plurality of cells of the cellular communications network.

34. The method of claim 1, wherein the transmitting of the upload content occurs during a scheduled group communication of the cellular communications network.

35. A method, comprising:
    when scheduling by a cellular communications network, transmission of a content item to a plurality of devices within the network, determining, by a controller of the cellular communications network, use conditions associated with a plurality of devices to receive the content item, wherein the use conditions include applications executing on the plurality of devices;
    forming, by the controller, a group of more than one of the plurality of devices based on the devices' respective use conditions;
    transmitting a group identifier to the plurality of devices that are admitted to the group; and
    transmitting, by the cellular communications network, the content item to the group of devices in a multicast transmission addressed using the group identifier.

* * * * *